US012536487B2

(12) United States Patent
Drennan, III et al.

(10) Patent No.: US 12,536,487 B2
(45) Date of Patent: Jan. 27, 2026

(54) ENTERPRISE ENTITY RESOLUTION AND MANAGEMENT TOOL

(71) Applicant: HARTFORD FIRE INSURANCE COMPANY, Hartford, CT (US)

(72) Inventors: Arthur Paul Drennan, III, Avon, CT (US); John Franklin Russo, Jr., West Hartford, CT (US); William C. Lewis, Avon, CT (US); Summer Tracy St George, Marlborough, CT (US); Aditi Baker, Scarsdale, NY (US)

(73) Assignee: HARTFORD FIRE INSURANCE COMPANY, Hartford, CT (US)

( * ) Notice: Subject to any disclaimer, the term of this patent is extended or adjusted under 35 U.S.C. 154(b) by 101 days.

(21) Appl. No.: 18/169,325

(22) Filed: Feb. 15, 2023

(65) Prior Publication Data

US 2024/0273437 A1   Aug. 15, 2024

(51) Int. Cl.
*G06Q 10/0635* (2023.01)
(52) U.S. Cl.
CPC .................... *G06Q 10/0635* (2013.01)
(58) Field of Classification Search
CPC .................................... G06Q 10/0635
USPC ......................................... 705/7.11
See application file for complete search history.

(56) References Cited

U.S. PATENT DOCUMENTS

| 8,239,677 | B2 | 8/2012 | Colson |
| 8,768,839 | B1 | 7/2014 | Hawkins et al. |
| 8,793,777 | B2 | 7/2014 | Colson |
| 11,444,784 | B2 | 9/2022 | Hatti |
| 2003/0033179 | A1* | 2/2003 | Katz ............... G06Q 10/0631 705/7.41 |
| 2003/0110070 | A1* | 6/2003 | De Goeij ......... G06Q 10/06393 705/7.29 |
| 2005/0055308 | A1* | 3/2005 | Meyer ............. G06Q 10/0635 705/38 |
| 2008/0086759 | A1 | 4/2008 | Colson |
| 2008/0091511 | A1 | 4/2008 | Monin et al. |

(Continued)

OTHER PUBLICATIONS

Kuperberg, Michael, "Blockchain-Based Identify Management: A Survey From the Enterprise and Ecosystem Perspective", IEEE Transactions on Engineering Management, vol. 67, No. 4, Nov. 2020, pp. 1008-1027. (Year: 2020).*

*Primary Examiner* — Amber A Misiaszek
(74) *Attorney, Agent, or Firm* — Buckley, Maschoff & Talwalkar LLC

(57) ABSTRACT

An entity data store contains electronic records associated with entities (e.g., businesses). For each entity, electronic records include an entity identifier, entity operational data, and parameters associated with that entity (e.g., business name, address, etc.). A resolution rule library contains electronic records associated with resolution rules, including a rule identifier and rule logic. An ingestion engine of a computer server receives big data input and accesses the resolution rule library. Based on resolution rule logic and the received big data input, the computer server automatically resolves that two electronic records with different entity identifiers are associated with a single entity. The computer server can then update the entity data store to reflect information for a resolved single entity identifier and automatically execute an enterprise workflow for a risk relationship between the enterprise and the entity represented by the resolved single entity identifier.

22 Claims, 19 Drawing Sheets

(56) References Cited

U.S. PATENT DOCUMENTS

| | | | |
|---|---|---|---|
| 2008/0133300 A1* | 6/2008 | Jalinous | G06Q 10/0637 |
| | | | 705/7.29 |
| 2012/0266227 A1 | 10/2012 | Colson | |
| 2014/0039935 A1 | 2/2014 | Rivera | |
| 2016/0247104 A1* | 8/2016 | Rosenfeld | G06Q 10/0635 |
| 2020/0090088 A1* | 3/2020 | Arora | G06Q 10/06393 |
| 2020/0295948 A1 | 9/2020 | Hatti | |
| 2021/0111891 A1 | 4/2021 | Inoue | |
| 2021/0112050 A1 | 4/2021 | Kurita | |
| 2023/0214925 A1* | 7/2023 | Cella | G06Q 30/06 |
| | | | 705/37 |

\* cited by examiner

| RESOLUTION RULE ID 1502 | RESOLUTION RULE NAME 1504 | LOGIC 1506 | DATE 1508 |
|---|---|---|---|
| RR_101 | POSTAL ADDRESS | STANDARDIZE POSTAL ADDRESS | 5/3/2025 |
| RR_102 | ABBREVIATION | "NY" EQUALS "NEW YORK" | 6/20/2021 |
| RR_103 | SPELLING | "COLOR" EQUALS "COLOUR" | 4/1/2025 |
| RR_104 | DBA | LINK TO PARENT COMPANY | 10/26/2022 |

ENTERPRISE ENTITY RESOLUTION AND MANAGEMENT TOOL

TECHNICAL FIELD

The present application generally relates to computer systems and more particularly to computer systems that are adapted to accurately and/or automatically resolve and/or manage entities for an enterprise.

BACKGROUND

An enterprise may enter into relationships with various entities (or potentially enter into relationships with entities in the future). For example, an insurer might enter into risk relationships (e.g., insurance agreements) with various businesses. Information about the entities might come from various sources (e.g., governmental data, credit rating data, local pre-existing enterprise tables, etc.) which can result in duplicate or otherwise incorrect results. For example, a restaurant might be referred to as "New York Pizza Palace" in one database while the same restaurant is referred to as "NY Pizza Palace" in another database. Moreover, business information may change over time (e.g., as additional employees are hired) which can result in conflicting data. Manually keeping track of these entities can be time consuming and error prone task—especially when a substantial number of entities are involved (e.g., tens of millions of businesses). In addition, it might be advantageous for an enterprise to maintain entity information about businesses even if no relationship currently exists. For example, an insurer or insurance agent might want the ability to quickly generate a list of all florists in a particular area code with between 5 and 20 employees (e.g., so that those businesses may be considered for a future insurance relationship).

It would be desirable to provide improved systems and methods to accurately and/or automatically provide enterprise entity resolution and management tools. Moreover, the results should be easy to access, understand, interpret, update, etc.

SUMMARY OF THE INVENTION

According to some embodiments, systems, methods, apparatus, computer program code and means are provided to accurately and/or automatically provide enterprise entity resolution and management tools in a way that provides fast and useful results and that allows for flexibility and effectiveness when responding to those results.

Some embodiments are directed to an enterprise entity resolution and/or management tool implemented via a back-end application computer server. An entity data store contains electronic records associated with entities (e.g., businesses). For each entity, electronic records include an entity identifier, entity operational data, and parameters associated with that entity (e.g., business name, address, etc.). A resolution rule library contains electronic records associated with resolution rules, including a rule identifier and rule logic. An ingestion engine of a computer server receives big data input and accesses the resolution rule library. Based on resolution rule logic and the received big data input, the computer server automatically resolves that two electronic records with different entity identifiers are associated with a single entity. The computer server can then update the entity data store to reflect information for a resolved single entity identifier and automatically execute an enterprise workflow for a risk relationship between the enterprise and the entity represented by the resolved single entity identifier.

Some embodiments comprise: means for receiving, by an ingestion engine, big data input including entity operational data and parameters associated with entities; means for accessing, by a computer processor of a back-end application computer server, information in a resolution rule library that contains electronic records associated with rules for resolving entities, including, for each rule, a set of electronic records including a resolution rule identifier and resolution rule logic; based on resolution rule logic from the resolution rule library and the received big data input, means for automatically resolving that two electronic records with different entity identifiers are associated with a single entity; means for updating the entity data store to reflect information for a resolved single entity identifier; and means automatically executing an enterprise workflow for a risk relationship between an enterprise and the entity represented by the resolved single entity identifier.

In some embodiments, a communication device associated with a back-end application computer server exchanges information with remote devices in connection with interactive graphical user interfaces. The information may be exchanged, for example, via public and/or proprietary communication networks.

A technical effect of some embodiments of the invention is an improved and computerized enterprise entity resolution and/or management tools that provide fast and useful results. With these and other advantages and features that will become hereinafter apparent, a more complete understanding of the nature of the invention can be obtained by referring to the following detailed description and to the drawings appended hereto.

BRIEF DESCRIPTION OF THE DRAWINGS

FIG. 15 is a portion of a tabular resolution rule library according to some embodiments.

DETAILED DESCRIPTION

Figure 1:
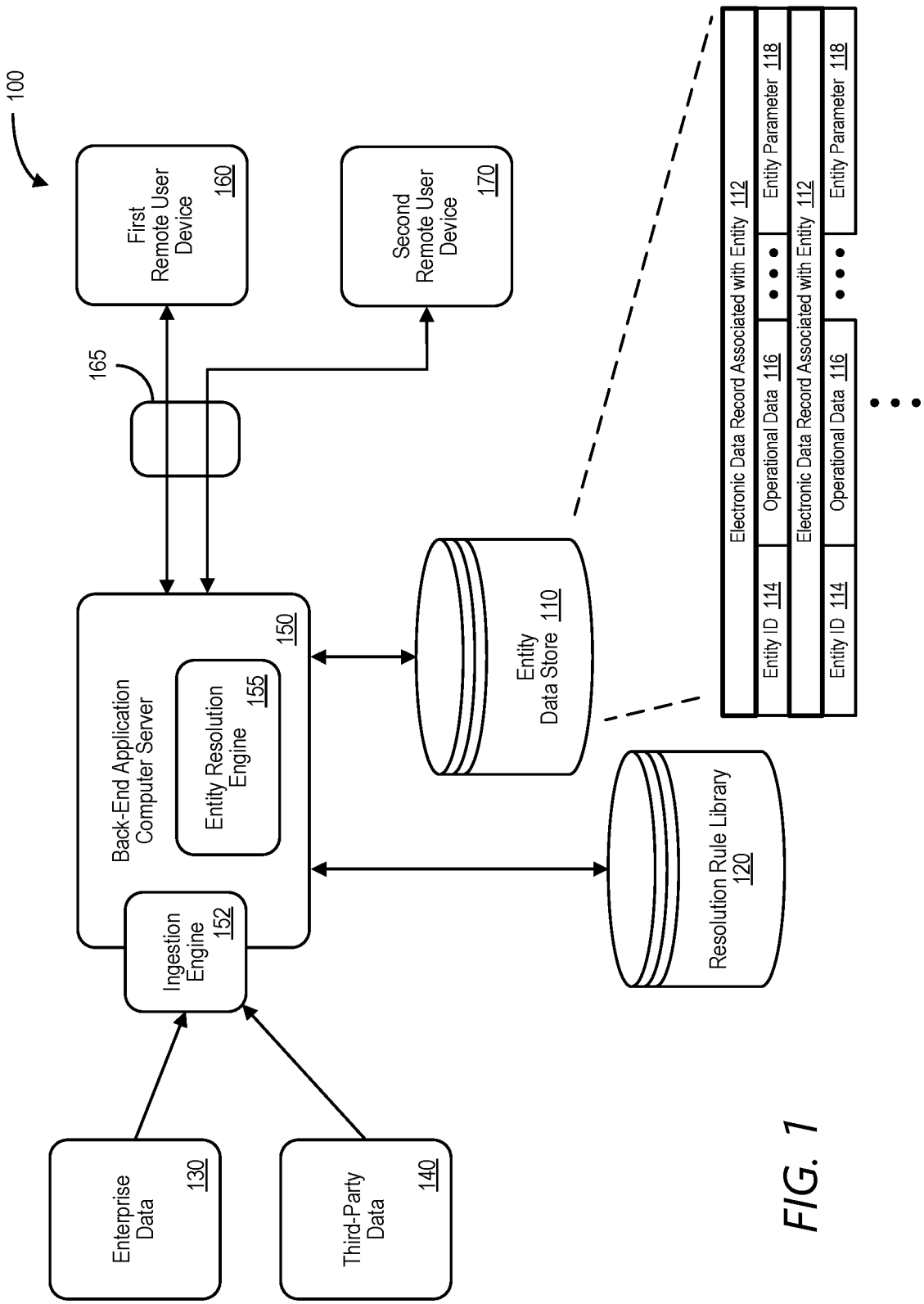
FIG. 1 is a high-level block diagram of an enterprise entity resolution and/or management system in accordance with some embodiments.

Before the various exemplary embodiments are described in further detail, it is to be understood that the present invention is not limited to the particular embodiments described. It is also to be understood that the terminology used herein is for the purpose of describing particular embodiments only and is not intended to limit the scope of the claims of the present invention.

In the drawings, like reference numerals refer to like features of the systems and methods of the present invention. Accordingly, although certain descriptions may refer only to certain figures and reference numerals, it should be understood that such descriptions might be equally applicable to like reference numerals in other figures.

The present invention provides significant technical improvements to facilitate data processing associated with entity resolution. The present invention is directed to more than merely a computer implementation of a routine or conventional activity previously known in the industry as it provides a specific advancement in the area of electronic record analysis by providing improvements in the operation of a computer system that customizes entity resolutions (including those associated with risk relationships). The present invention provides improvement beyond a mere generic computer implementation as it involves the novel ordered combination of system elements and processes to provide improvements in the speed and accuracy of such an enterprise resolution and/or management tool. Some embodiments of the present invention are directed to a system adapted to automatically customize and execute entity resolutions, aggregate entity data from multiple big data sources, automatically optimize enterprise information to reduce unnecessary messages or communications, etc. (e.g., to avoid sending duplicate information to the same business). Moreover, communication links and messages may be automatically established, aggregated, formatted, modified, removed, exchanged, etc. to improve network performance (e.g., by reducing an amount of network messaging bandwidth and/or storage required to create entity resolution messages, improve security, reduce the size of an entity data store, more efficiently collect entity data, etc.).

FIG. 1 is a high-level block diagram of an enterprise entity resolution and/or management system 100 that may be provided according to some embodiments of the present invention. In particular, the system 100 includes a back-end application computer server 150 that may access information in an entity data store 110 (e.g., storing a set of electronic records associated with entities 112, each record including, for example, one or more entity identifiers 114, operational data 116, entity parameters 118, etc.). The back-end application computer server 150 may also store information into other data stores, such as a resolution rule library 120, and utilize an ingestion engine 152 and entity resolution engine 155 to exchange and process messages (e.g., daily/ weekly data sweeps or on-demand changes) and view, analyze, and/or update the electronic records. The back-end application computer server 150 may also exchange information with a first remote user device 160 and a second remote user device 170 (e.g., via a firewall 165). According to some embodiments, an interactive graphical user interface platform of the back-end application computer server 150 (and, in some cases, enterprise data 130 and/or third-party data 140) may facilitate entity resolution, workflow recommendations, alerts, and/or the display of results via one or more remote administrator computers (e.g., to summarize system 100 performance) and/or the remote user devices 160, 170. For example, the first remote user device 160 may transmit annotated and/or updated information to the back-end application computer server 150. Based on the updated information, the back-end application computer server 150 may adjust data in the entity data store 110 and/or the resolution rule library 120 and the change may (or may not) be used in connection with the second remote user device 170 (e.g., depending on whether the two users are associated with the same enterprise). Note that the back-end application computer server 150 and/or any of the other devices and methods described herein might be associated with a third party, such as a vendor that performs a service for an enterprise.

The back-end application computer server 150 and/or the other elements of the system 100 might be, for example, associated with a Personal Computer ("PC"), laptop computer, smartphone, an enterprise server, a server farm, and/or a database or similar storage devices. According to some embodiments, an "automated" back-end application computer server 150 (and/or other elements of the system 100) may facilitate the automated access and/or update of electronic records in the data stores 110, 120 and/or the resolution of entities. As used herein, the term "automated" may refer to, for example, actions that can be performed with little (or no) intervention by a human.

As used herein, devices, including those associated with the back-end application computer server 150 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The back-end application computer server 150 may store information into and/or retrieve information from the entity data store 110 and/or the resolution rule library 120. The data stores 110, 120 may be locally stored or reside remote from the back-end application computer server 150. As will be described further below, the entity data store 110 may be used by the back-end application computer server 150 in connection with an interactive user interface to access and update electronic records. Although a single back-end application computer server 150 is shown in FIG. 1, any number of such devices may be included. Moreover, various devices described herein might be combined according to embodiments of the present invention. For example, in some embodiments, the back-end application computer server 150 and entity data store 110 might be co-located and/or may comprise a single apparatus.

Figure 2:
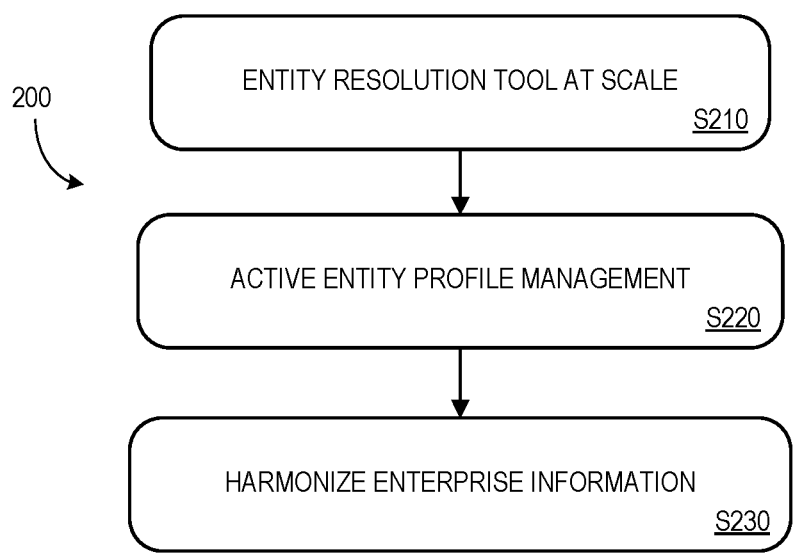
FIG. 2 illustrates a high-level method according to some embodiments.

The elements of the system 100 may work together to perform the various embodiments of the present invention. FIG. 2 illustrates a high-level method 200 according to some embodiments. At S210, an entity resolution tool "at scale" (e.g., capable of supporting the ingestion of big data streams) may be provided. As used herein, the phrase "entity resolution" may refer to, for example, any process that ingests information from multiple sources and arranges to correlate the information such that data about a single entity (e.g., a commercial business) can be identified, consolidated, supplemented, etc. An aspect of entity resolution may involve the removal and combination of information from multiple electronic records that, in reality, actually reference the same entity. Such an approach may, for example, help build a robust profile of commercial businesses.

At S220, active entity profile management may be performed. For example, an enterprise may periodically rebuild entity profiles to recognize that entity characteristics change over time. According to some embodiments, the system may keep ingesting data from an original set of data sources but also acquire other, additional data resources. In this case, the new information may be correlated to (and blended with) the data from the original sources. In some cases, this management may trigger an activity (e.g., such as suggesting a change to an insurance policy). For example, if it is determined that a business has increased the size of a retail store the system may update the associated entity information and automatically suggest that an insurance agent contact the business to recommend an increase in insurance coverage.

At S230, the system may harmonize enterprise information. For example, an insurance company may already have a substantial amount of data associated with existing customers (e.g., in connection with various insurance policies). In this case, newly ingested entity data could be combined with the existing insurance data to increase the accuracy and completeness of that information.

Figure 3:
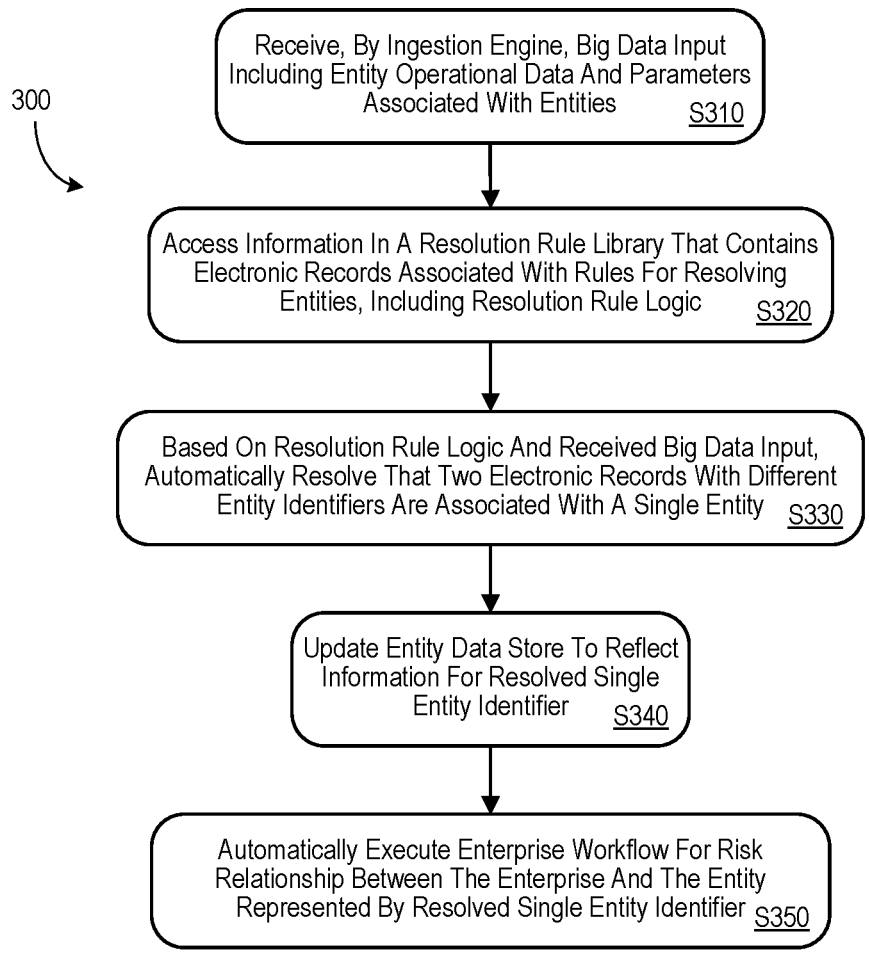
FIG. 3 illustrates an entity resolution method according to some embodiments.

Note that the system 100 of FIG. 1 is provided only as an example, and embodiments may be associated with additional elements or components. According to some embodiments, the elements of the system 100 automatically transmit information associated with an interactive user interface display over a distributed communication network. FIG. 3 illustrates a method 300 that might be performed by some or all of the elements of the system 100 described with respect to FIG. 1, or any other system, according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S310, an ingestion engine may receive big data input including entity operational data and parameters associated with entities (e.g., commercial businesses). The entity might represent, for example, a retail store, a restaurant, a manufacturer, on online merchant, a sole proprietor, a gig-economy worker, etc. The entity operational data might include, for example, business information such as an income, a business size (e.g., in square feet), a number of employees, a business type (e.g., represented by a Standard Industrial Classification ("SIC") code), etc. The parameters associated with an entity might include, for example, a business name, one or more business addresses, a business owner, etc. Note that the ingestion of this information might be performed periodically (e.g., monthly) and/or upon a change in value (e.g., when a new business is added to a data source).

Note that the information in the entity data store can be based on a wide range of data sources, including an enterprise database (e.g., representing existing insurance customers). As another example, the information could be received from one or more governmental databases (e.g., associated with the US Department of Labor, a tax identification number, various secretaries of state, departments of motor vehicles, etc.). As still another example, the information might come from a third-party database such as one associated with a credit reporting agency (e.g., EXPERIAN®, EQUIFAX®, DUN & BRADSTREET®, etc.). According to some embodiments, information may be extracted from the web (e.g., to determine a business address, website, phone number, etc.) including social media information (e.g., FACEBOOK®, INSTAGRAM®, TIC TOK®, etc.) and reputational data (e.g., YELP®, ANGIE'S LIST®, customer reviews, etc.).

At S320, a computer processor of the back-end application computer server may access information in a resolution rule library. The resolution rule library may, according to some embodiments, contain electronic records associated with rules for resolving entities, including (for each rule) a set of electronic records including a resolution rule identifier and resolution rule logic. The resolution rule logic might be associated with, for example, data deduplication, spelling variations, entity ownership information (e.g., including parent companies, Doing Business As ("DBA") data, etc., location information (e.g., ways to standardize postal addresses), etc.

Based on resolution rule logic from the resolution rule library and the received big data input, at S330 the system may automatically resolve that two electronic records with different entity identifiers are associated with a single entity. For example, it might be determined that a commercial business associated with a first record identifier is, in fact, the same business that is associated with a second record identifier. By way of example only, a similarity score for two records 1 and 2 might be calculated as follows:

$$S_{12} = w_A \times f(A_1, A_2) + w_B \times f(B_1, B_2) + \ldots + w_N \times f(N, N_2)$$

where $S_{12}$ is the similarity score, A, B, . . . , N are various record parameters, $f( )$ is a function to calculate how similar two parameters are, and w is a weight for each parameter.

At S340, the system can then update the entity data store to reflect information for a resolved single entity identifier (e.g., by combining or merging information from the two electronic records). Moreover, at S350 an enterprise workflow is automatically executed for a risk relationship (e.g., an insurance policy) between the enterprise and the entity represented by the resolved single entity identifier. When the enterprise is associated with an insurer, the enterprise workflow might be associated with a risk relationship quote (e.g., a workflow for electronic records that meet a predetermined criteria might involve sending an electronic message to an underwriter asking them to prepare an insurance premium quote), a new risk relationship (e.g., a workflow for an electronic record that meet another predetermined criteria might automatically undergo a supplemental review process before an insurance policy is issued), an adjustment to an existing risk relationship (e.g., suggesting a change to an insurance limit or deduction), a risk relationship renewal, etc. As used herein, the phrase "risk relationship" may be associated with, for example, general liability insurance, workers' compensation insurance, business insurance, vehicle insurance, health insurance, professional liability insurance, cyber insurance, property insurance, disaster insurance, etc.

Figure 4:
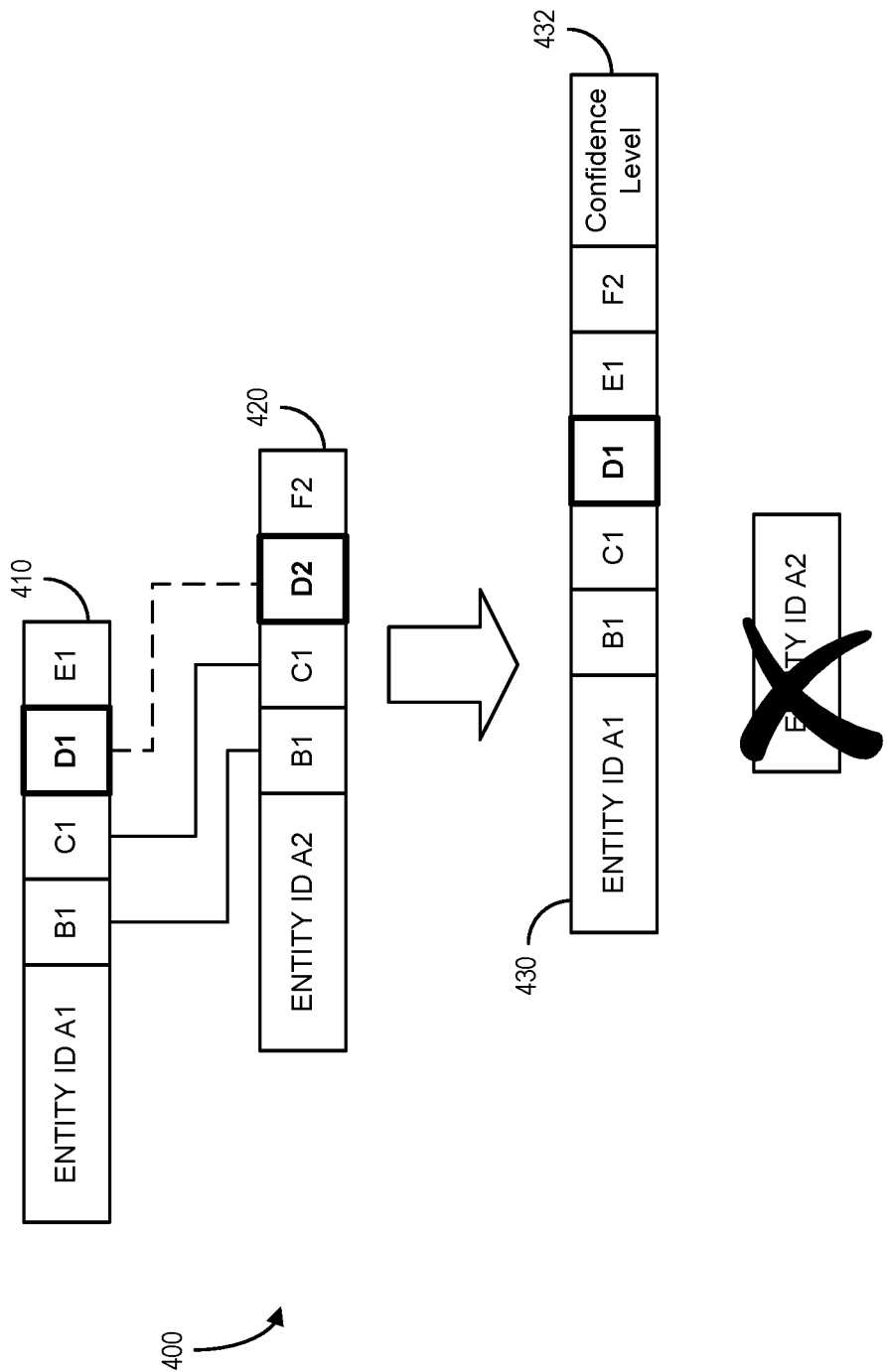
FIG. 4 is an entity combination example in accordance with some embodiments.

The entity resolution process may adjust electronic records in various ways. FIG. 4 is an entity combination example 400 in accordance with some embodiments. A first record 410 has an entity identifier A1 and parameters C1, B1, D1, and E1. A second record 420 has an entity identifier A2 and parameters B1, C1, D2, and F2. That is, both records 410 share the identical parameters B1 and C1 (as illustrated by the solid line in FIG. 4). However, the parameter D1 in the first record 410 differs slightly from the corresponding parameter D2 in the second record (as illustrated by the solid line in FIG. 4). For example, D1 might represent "55 Main Street" while D2 represents "55 Main St.-Apt. 1." Resolution rule logic applied by the system may recognize these two records 410, 420 are associated with a single commercial business. According to some embodiments, the entity resolution outputs a confidence level 432 that indicates how sure the system is that the records 410, 420 are really for a single business. The confidence level 432 may be used to investigate whether changes to rule logic might appropriate.

Figure 5:
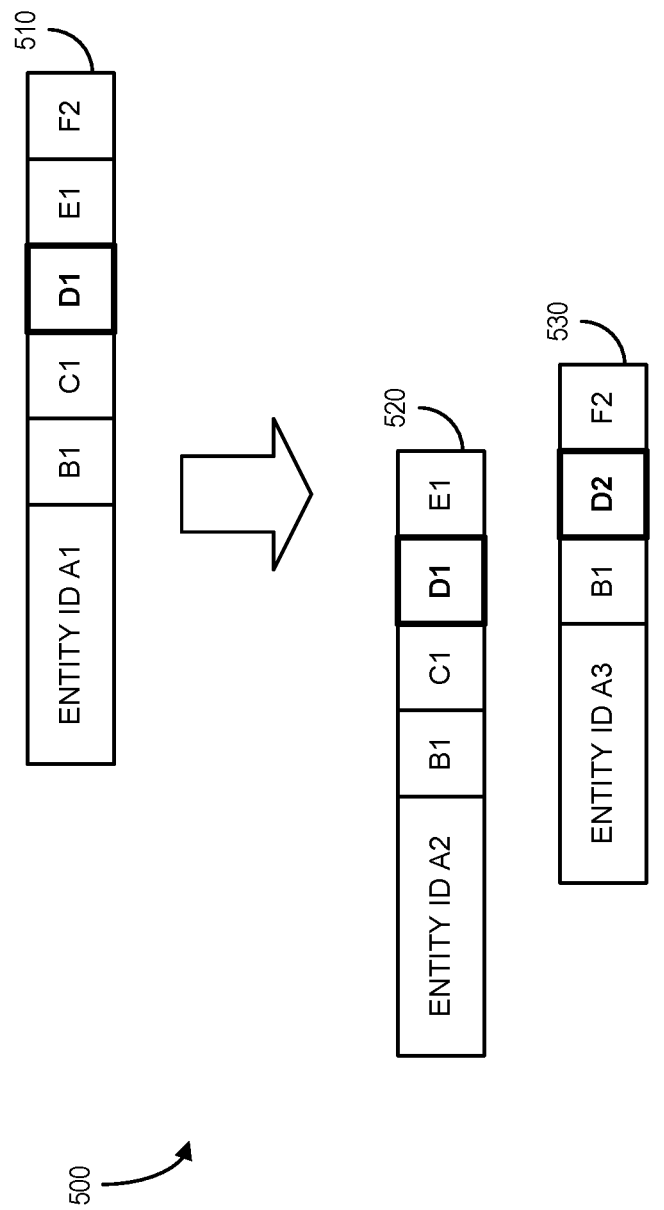
FIG. 5 illustrates an entity splitting example according to some embodiments.

As a result, the system may automatically combine the two records 410, 420 and create a new record 430. The new record 430 might be associated with one of the original record identifiers (A1 or A2) or an entirely new identifier. Note that the first record 410 includes information that the second record 420 lacks (E1), and the second record includes information that the first record 410 lacks (F2). The new record 430 includes parameters from both original records 410, 420 (B1, C1, D1, E1, and F2). Note that either D1 or D2 might be selected to be included in the new record 430 (e.g., based on a rating associated with the sources associated with the original records 410, 420, when the parameter was last updated, etc.). In contrast, FIG. 5 illustrates an entity splitting example 500 according to some embodiments. Here, it has been determined that an original record 510 actually includes information about two distinct entities. As a result, two records 520, 530 are created to reflect that reality. According to some embodiments, a confidence level might also be generated indicating how sure the system is that the record 510 actually contains information about multiple entities.

Figure 6:
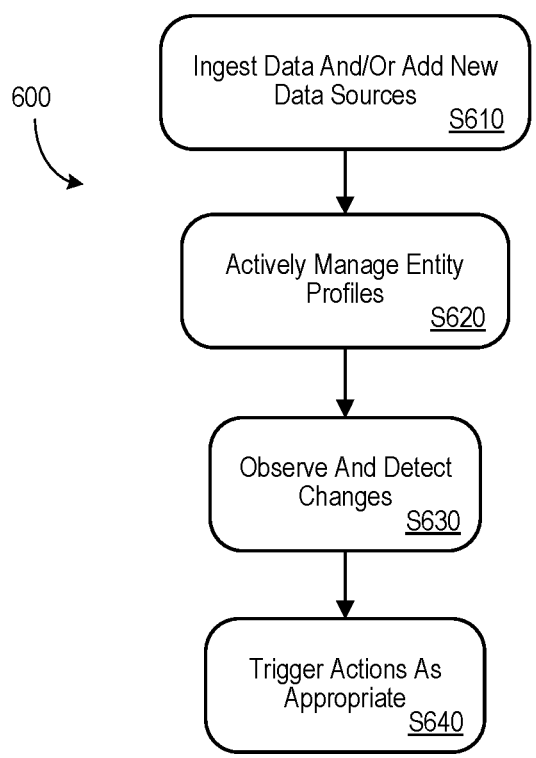
FIG. 6 is an entity profile management method in accordance with some embodiments.

FIG. 6 is an entity profile management method 600 in accordance with some embodiments. At S610, an enterprise ingests big data associated with entities and/or adds new data sources. At S620, the system actively manages entity profiles. For example, newly ingested data might be swiftly and automatically matched to existing entity identifiers. At S630, the system observes and detects relevant changes associated with an entity. For example, an entity originally associated with a 12,000 square foot business making on average $400,000 per month now might be associated with 20,000 square feet and make $600,000 per month. At S640, an action is automatically triggered as appropriate. For example, an insurance agent might automatically receive a message indicating that the business should be contacted to add a new or adjust an existing risk relationship with the enterprise.

Figure 7:
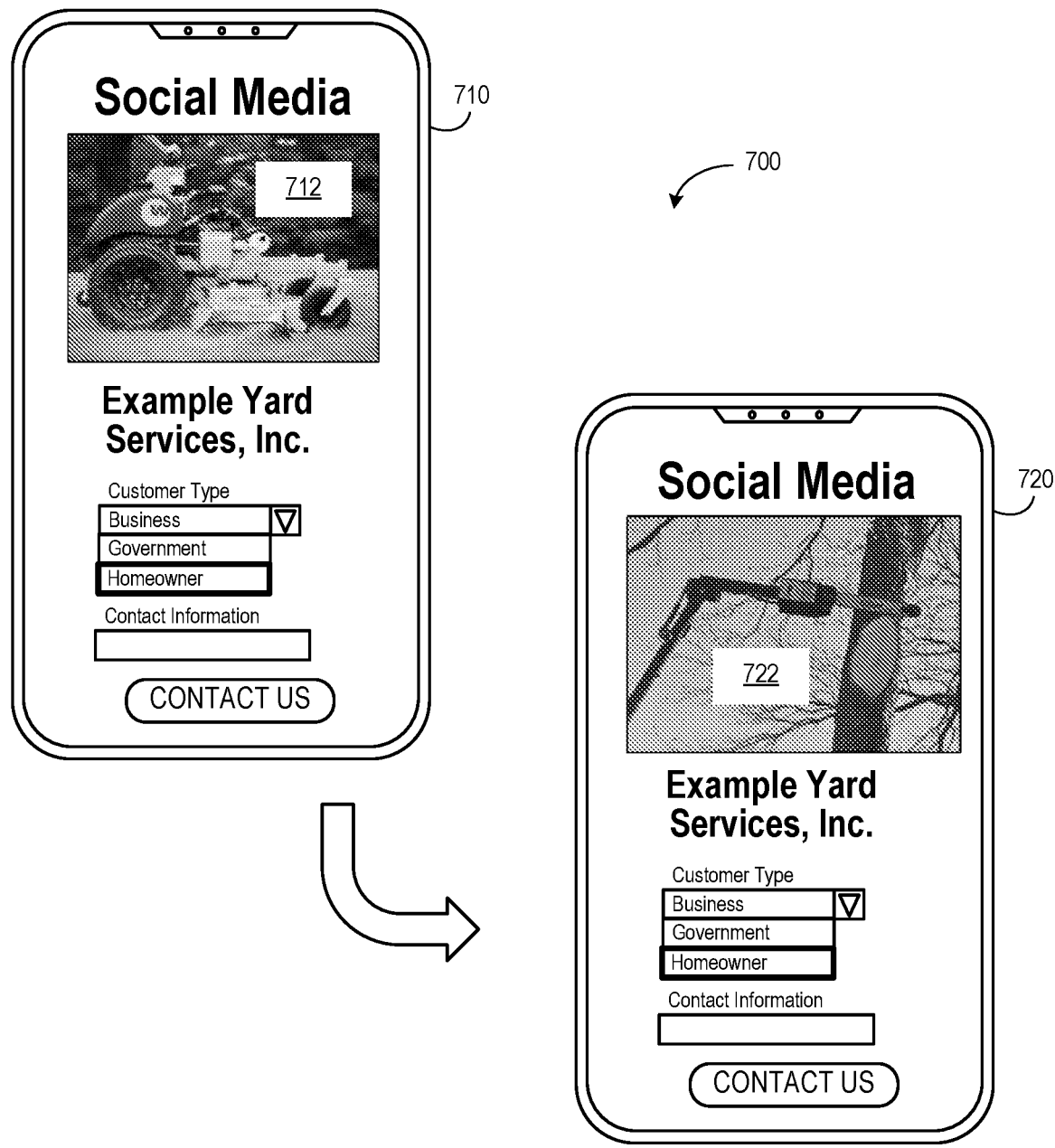
FIG. 7 illustrates an example according to some embodiments.

FIG. 7 illustrates an example 700 according to some embodiments. An original social media web page 710 for a small business may be ingested. An image 712 of the business on the web page 710 might be automatically analyzed to determine a type of work the business performs (e.g., mowing lawns as illustrated by the image 712). Subsequently, a new version of the social media web page 720 might be ingested. Moreover, a new image 722 might be analyzed to determine that a new type of work is being performed by the business (e.g., cutting tree limbs). In this case, the system might determine that existed risk relationships between the enterprise and that particular business should be re-visited. In addition to analyzing images, the system may perform text mining and/or Natural Language Processing ("NLP") to understand information in connection with any of the embodiments described herein.

Figure 8:
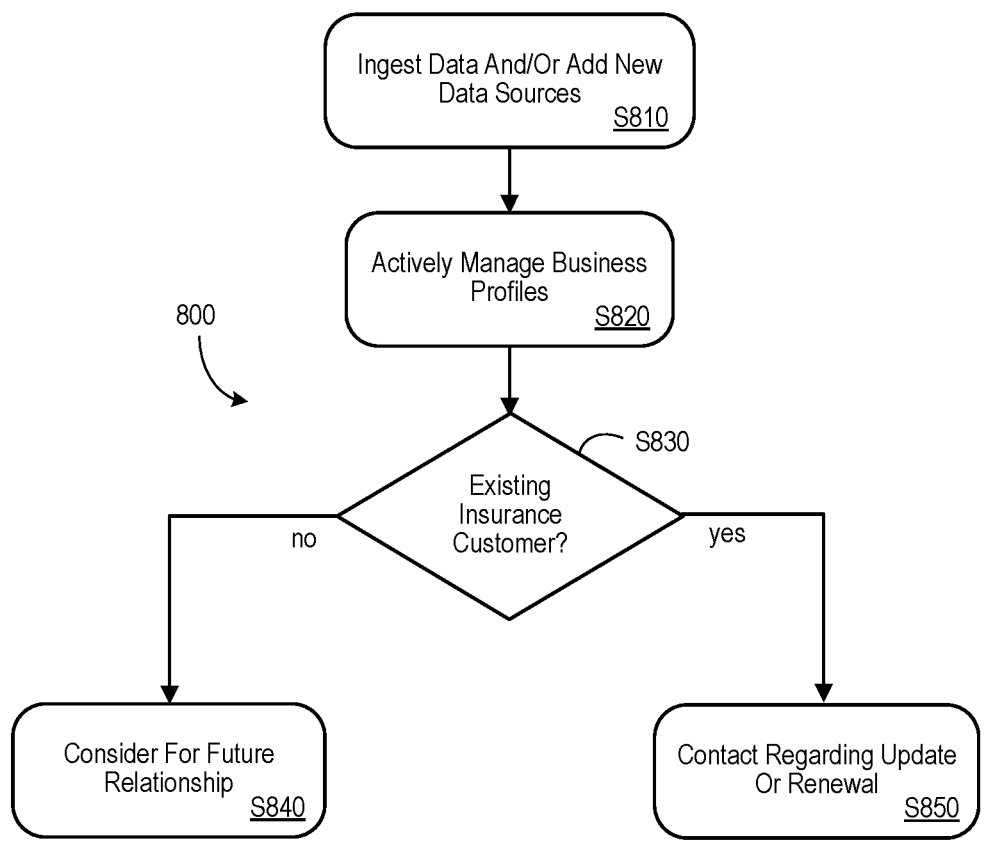
FIG. 8 are examples of insurance lifecycle decisions in accordance with some embodiments.

FIG. 8 are examples of insurance lifecycle decisions 800 in accordance with some embodiments. As before, at S810 an enterprise ingests big data associated with entities and/or adds new data sources. At S820, the system actively manages entity profiles. For example, newly ingested data might be swiftly and automatically matched to existing entity identifiers. At S830, the system might access local enterprise tables (e.g., associated with existing insurance customers) to determine if a business is currently a customer of the enterprise. If the business is not an existing insurance customer at S830, that business might be considered for a future insurance relationship at S840. If the business is an existing insurance customer at S830, it might trigger an action to adjust an existing policy or flag a policy for further examination upon renewal at S850.

Figure 9:
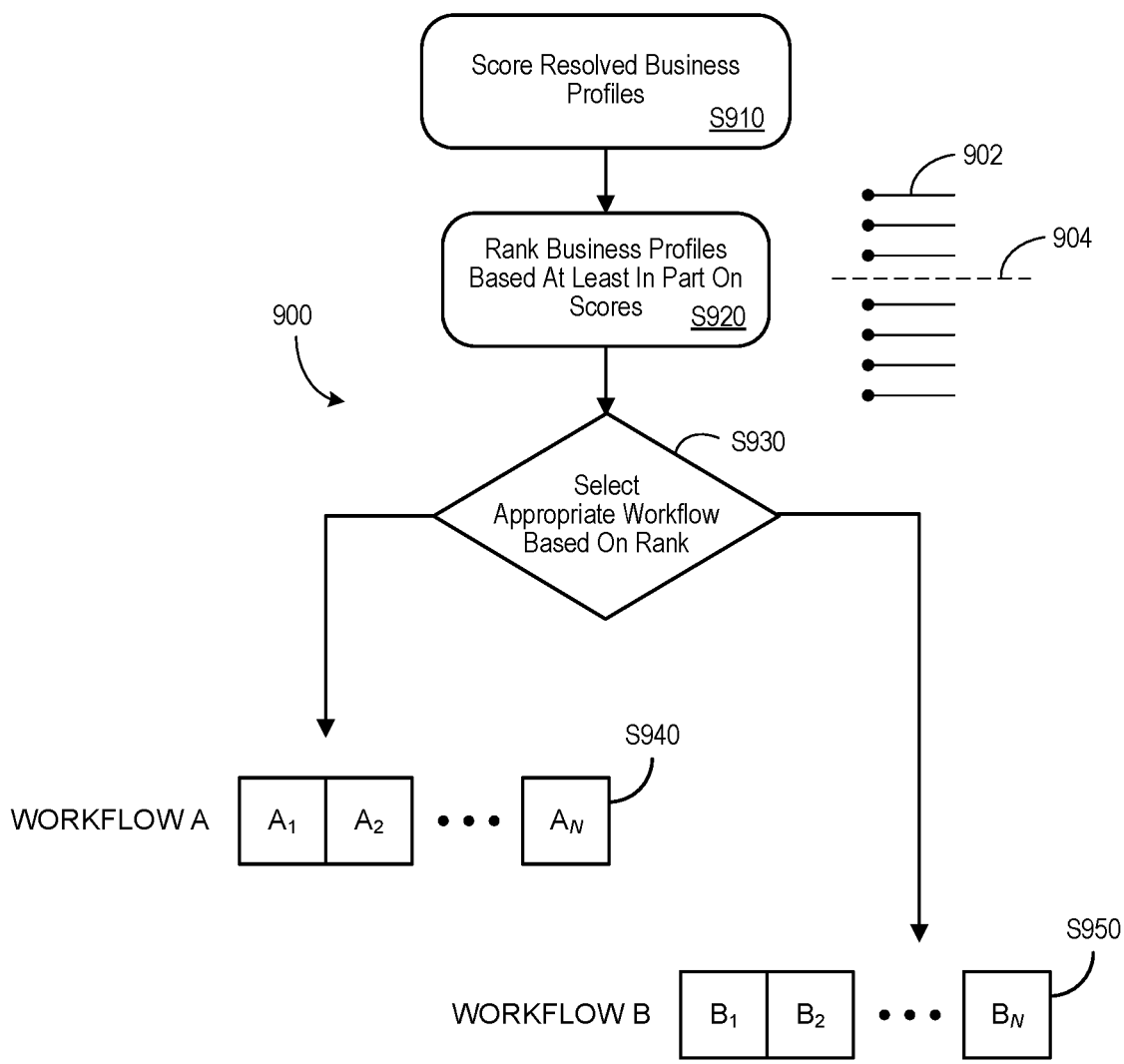
FIG. 9 illustrates ranking based workflow selection according to some embodiments.

FIG. 9 illustrates ranking based workflow selection 900 according to some embodiments. At S910, the system may score resolved business profiles. For example, a risk score might be calculated for each business based on underwriting factors including business operating parameters. The system may then rank the business profiles based at least in part on those scores at S920 (e.g., with some ranked entities 902 falling below a predetermined threshold level 904). At S930, an appropriate workflow may be selected based on that ranking. For example, workflow A (steps $A_1$ through $A_n$) may be executed at S940 for business above the threshold 904 (e.g., indicating a relatively high level of risk that requires a more detailed review) as compared to workflow B (steps $B_1$ through $B_n$) which is executed at S950 for business below the threshold 904 (e.g., indicating a relatively low level of risk that only needs a less detailed review).

Figure 10:
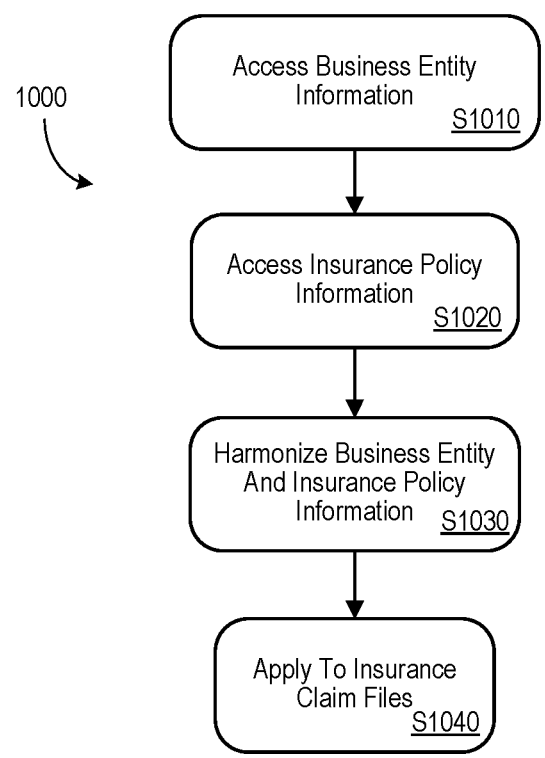
FIG. 10 illustrates a harmonization of risk relationship data in accordance with some embodiments.

According to some embodiments, having a single, universal entity identifier accurately correlated with each business lets an insurer harmonize business information with existing insurance data. For example, FIG. 10 illustrates a harmonization of risk relationship data 1000 in accordance with some embodiments. At S1010, business entity information is accessed. At S1020, insurance policy information is accessed. Because both the business entity information and insurance policy information are tied to a single, universal entity identifier, the system can harmonize the business entity and insurance policy information at S1030. For example, the insurance policy information might be flagged or updated to reflect the new business information. At S1040, this harmonized information can then be applied to claim files in accordance with some embodiments. For example, a claimant identified as a potential bad actor in connection with a first business might be flagged as a potential bad action in connection with a parent company that owns the first business as reflected in the entity data store.

Figure 11:
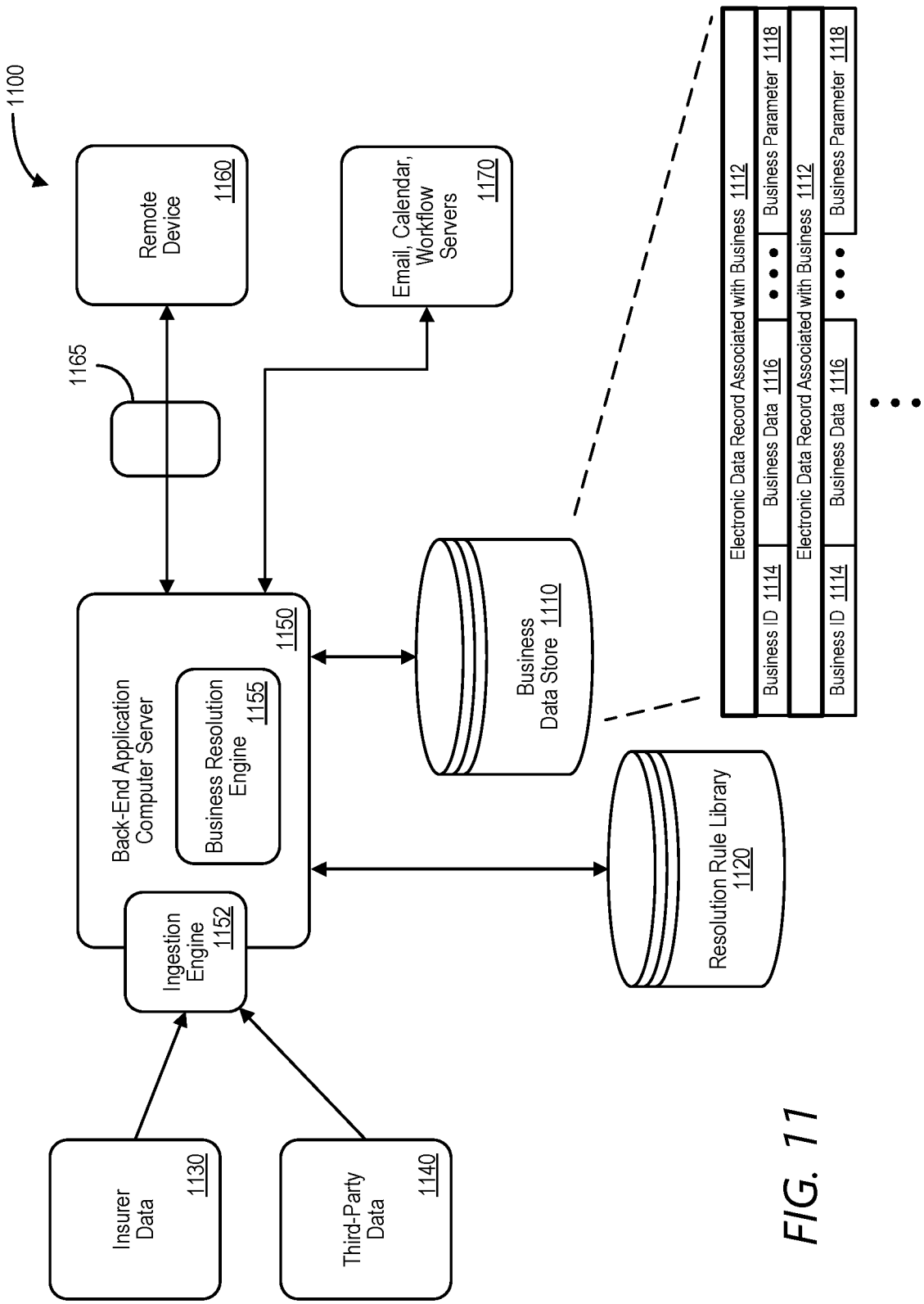
FIG. 11 is a more detailed system according to some embodiments.

FIG. 11 is a more detailed system 1100 according to some embodiments. As before, the system 1100 includes a back-end application computer server 1150 that may access information in a business data store 1110 (e.g., storing a set of electronic records associated with businesses 1112, each record including, for example, one or more business identifiers 1114, business data 1116, business parameters 1118, etc.). The back-end application computer server 1150 may also store information into other data stores, such as a resolution rule library 1120, and utilize an ingestion engine 1152 and business resolution engine 1155 to exchange and process messages (e.g., daily/weekly data sweeps or on-demand changes) and view, analyze, and/or update the electronic records based on insurer data 1130, third-party data 1140, etc. The back-end application computer server 1150 may also exchange information with a remote device 1160 (e.g., via a firewall 1165). According to some embodiments, the back-end application computer server 1150 may interact with an email server (e.g., to automatically establish communication links and/or transmit electronic messages), a calendar server (e.g., to automatically schedule tasks or communications), and/or a workflow server (e.g., to initiate actions by employees of the enterprise) 1170.

Figure 12:
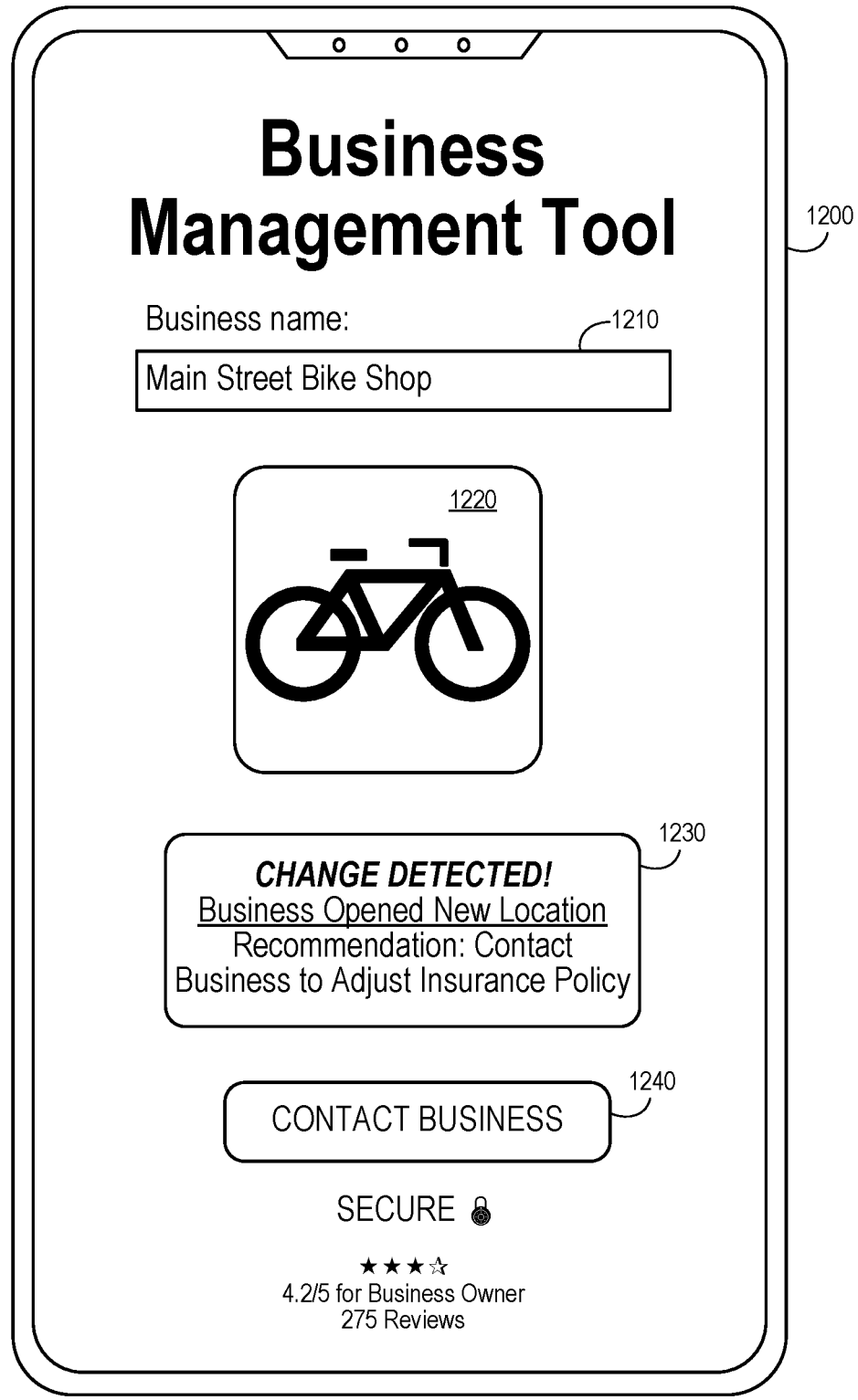
FIG. 12 illustrates an agent interface in accordance with some embodiments.

The information collected and processed by the system 1100 may then be used to initiate actions to be performed in connection with insurance policies. For example, FIG. 12 illustrates an agent interface 1200 in accordance with some embodiments. The interface 1200 includes a business name 1210 and image 1220 (e.g., a photograph of a storefront or logo) determined in connection with an associated entity identifier. The interface also includes an alert 1230 automatically generated based on newly ingested business information (e.g., the fact that the business opened a new location). The alert 1230 may further include a recommended action (e.g., to contact the business to suggest an adjustment to existing insurance policies). According to some embodiments, a "Contact Business" icon 1240 may be selected to automatically connect the insurance agent with the business (e.g., based on communication link parameters in the entity data store).

Figure 13:
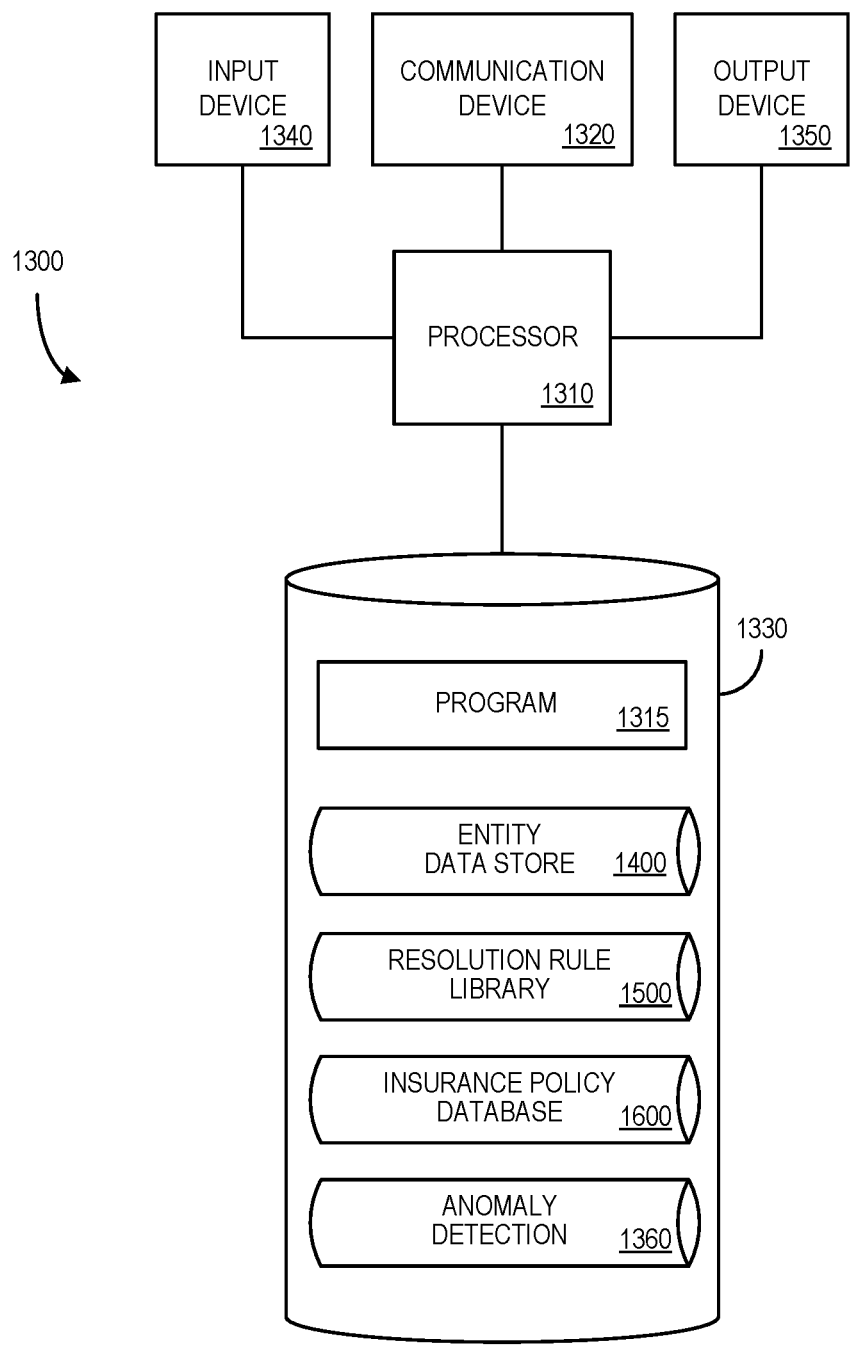
FIG. 13 is a block diagram of an apparatus in accordance with some embodiments.

The embodiments described herein may be implemented using any number of different hardware configurations. For example, FIG. 13 illustrates an apparatus 1300 that may be, for example, associated with the systems 100, 1100 described with respect to FIGS. 1 and 11, respectively. The apparatus 1300 comprises a processor 1310, such as one or more commercially available Central Processing Units ("CPUs") in the form of one-chip microprocessors, coupled to a communication device 1320 configured to communicate via a communication network (not shown in FIG. 13). The communication device 1320 may be used to communicate, for example, with one or more remote third-party business or economic platforms, administrator computers, insurance agent, and/or communication devices (e.g., PCs and smartphones). Note that communications exchanged via the communication device 1320 may utilize security features, such as those between a public internet user and an internal network of an insurance company and/or an enterprise. The security features might be associated with, for example, web servers, firewalls, and/or PCI infrastructure. The apparatus 1300 further includes an input device 1340 (e.g., a mouse and/or keyboard to enter information about data sources, entity resolution rules or preferences, third-parties, etc.) and an output device 1350 (e.g., to output reports regarding user entity resolutions, machine learning algorithms, recommendations, alerts, etc.).

The processor 1310 also communicates with a storage device 1330. The storage device 1330 may comprise any appropriate information storage device, including combinations of magnetic storage devices (e.g., a hard disk drive), optical storage devices, mobile telephones, and/or semiconductor memory devices. The storage device 1330 stores a program 1315 and/or an entity resolution tool or application for controlling the processor 1310. The processor 1310 performs instructions of the program 1315, and thereby operates in accordance with any of the embodiments described herein. For example, the processor 1310 may receive big data input and, based on resolution rule logic and the received big data input, automatically resolve that two electronic records with different entity identifiers are associated with a single entity. The processor 1310 can then update records to reflect information for a resolved single entity identifier and automatically execute an enterprise workflow for a risk relationship between the enterprise and the entity represented by the resolved single entity identifier.

The program 1315 may be stored in a compressed, uncompiled and/or encrypted format. The program 1315 may furthermore include other program elements, such as an operating system, a database management system, and/or device drivers used by the processor 1310 to interface with peripheral devices.

As used herein, information may be "received" by or "transmitted" to, for example: (i) the apparatus 1300 from another device; or (ii) a software application or module within the apparatus 1300 from another software application, module, or any other source.

In some embodiments (such as shown in FIG. 13), the storage device 1330 further includes an entity data store 1400, a resolution rule library 1500, an insurance policy database 1600, and anomaly detection data 1360 (e.g., a list of entities that could not be resolved in a satisfactory manner). Examples of databases that might be used in connection with the apparatus 1300 will now be described in detail with respect to FIGS. 14 through 16. Note that the databases described herein are only examples, and additional and/or different information may be stored therein. Moreover, various databases might be split or combined in accordance with any of the embodiments described herein. For example, the enterprise data store 1400 and resolution rule library 1500 might be combined and/or linked to each other within the program 1315.

Figure 14:
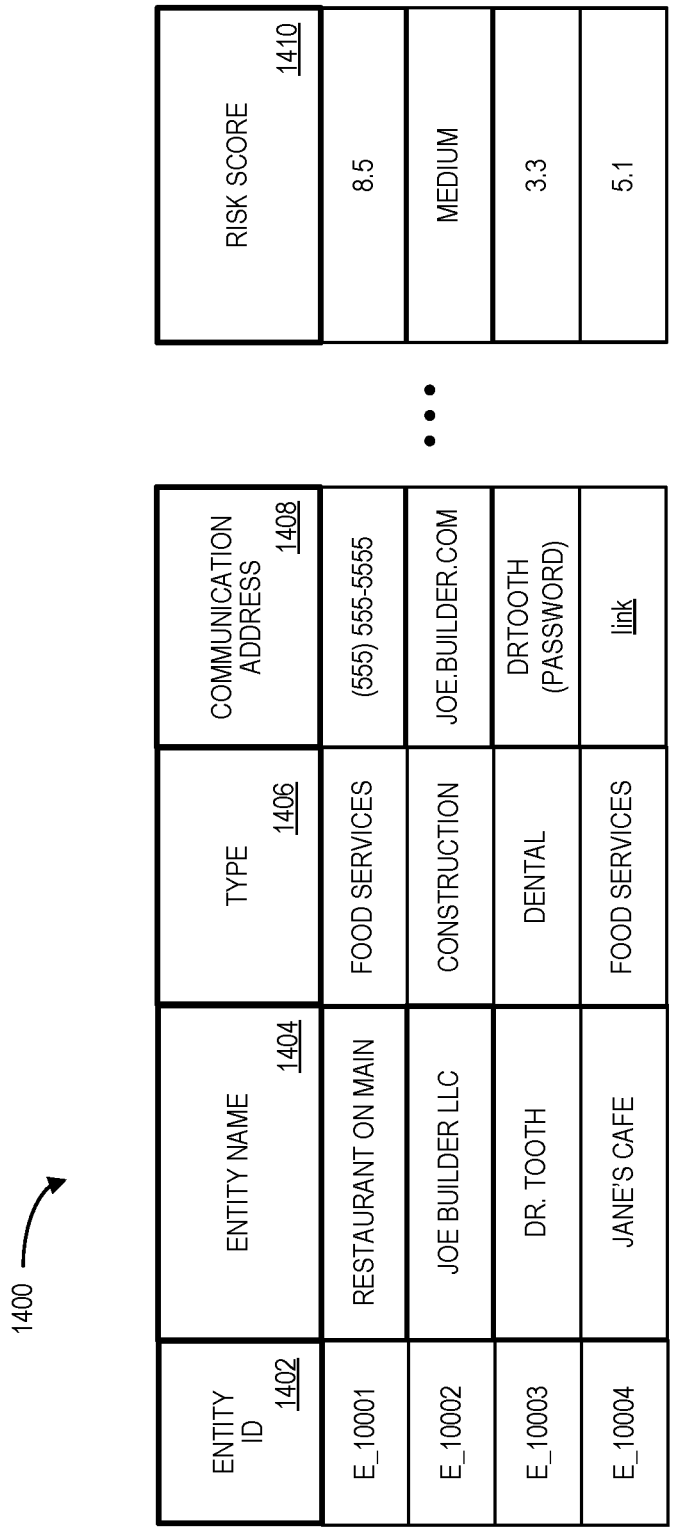
FIG. 14 is a portion of a tabular entity data store according to some embodiments.

Referring to FIG. 14, a table is shown that represents the entity data store 1400 that may be stored at the apparatus 1300 according to some embodiments. The table may include, for example, entries associated with businesses throughout the US and/or international businesses. The table may also define fields 1402, 1404, 1406, 1408, 1410 for each of the entries. The fields 1402, 1404, 1406, 1408, 1410 may, according to some embodiments, specify: an entity identifier 1402, an entity name 1404, a type 1406, a communication address 1408, and a risk score 1410. The entity data store 1400 may be created and updated, for example, based on information electrically received from various big data sources (e.g., including when a new data source is added or existing information is adjusted) in connection with an insurer.

The entity identifier 1402 may be, for example, a unique alphanumeric code identifying a commercial business. The entity name 1404 may comprise the name of the business and the type 1406 may reflect the kind of work that is normally performed by the business. The communication address 1408 may be used, for example, to automatically connect an insurance agent with the business. The risk score 1410 calculated for the business might be used to rank businesses, select appropriate insurance workflows, etc.

Referring to FIG. 15, a table is shown that represents the resolution rule library 1500 that may be stored at the apparatus 1300 according to some embodiments. The table may include, for example, entries associated rules and logic that may be used to resolve entity information. The table may also define fields 1502, 1504, 1506, 1508 for each of the entries. The fields 1502, 1504, 1506, 1508 may, according to some embodiments, specify: a resolution rule identifier 1502, a resolution rule name 1504, logic 1506, and a date 1508. The resolution rule library 1500 may be created and updated, for example, based on information electrically received from an operator or administrator.

The resolution rule identifier 1502 may be, for example, a unique alphanumeric code identifying a rule to be applied when resolving entity information. The resolution rule name 1504 may describe the rule and the logic 1506 may define how the rule is to be executed. For example, the "Abbreviation" rule might have logic 1506 change things like "NY" into "New York." The date 1508 may indicate when the rule was added to the system, when the rule was last adjusted, etc. The date 1508 might be used, for example, to determine which resolution rule identifier 1502 should take precedence when multiple rules could be applied.

Figure 16:
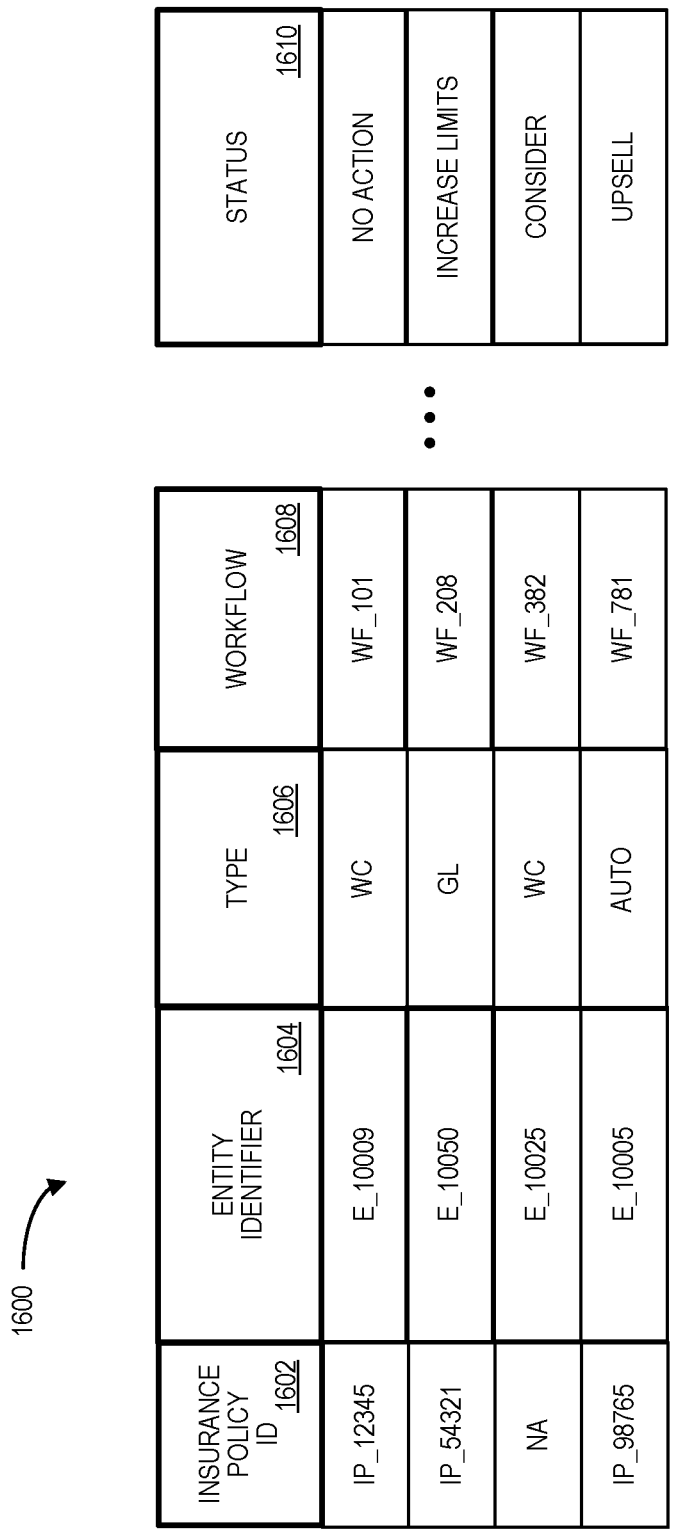
FIG. 16 is a portion of a tabular insurance policy database according to some embodiments.

Referring to FIG. 16, a table is shown that represents the insurance policy database 1600 that may be stored at the apparatus 1300 according to some embodiments. The table may include, for example, entries associated with risk relationships between an enterprise and various customers. The table may also define fields 1602, 1604, 1606, 1608, 1610 for each of the entries. The fields 1602, 1604, 1606, 1608, 1610 may, according to some embodiments, specify: an insurance policy identifier 1602, an entity identifier 1604, a type 1606, a workflow 1608, and a status 1610. The insurance policy database 1600 may be created and updated, for example, based on local enterprise data and/or information that electrically received from various big data sources in connection with an insurer.

The insurance policy identifier 1602 may be, for example, a unique alphanumeric code identifying a risk relationship between an enterprise (e.g., an insurer) and a customer (or potential customer). The entity identifier 1604 may be, for example, a unique alphanumeric code identifying a commercial business and may be based on, or associated with, the entity identifier 1402 in the entity data store 1400. The 1606 may reflect the kind of insurance associated with the risk relationship (e.g., workers' compensation, general liability, etc.). The workflow 1608 may be used, for example, to automatically select a series of tasks or actions to be performed in connection with the insurance policy identifier 1602. The status 1610 might indication "no action," suggest an adjustment to an insurance policy (e.g., via the communication address 1408 in the entity data store 1400), recommend an upsell opportunity (e.g., adding a new type of insurance for an existing customer), etc. Note that entity identifier 1604 "E_10025" may represent a potential future customer, and thus no current insurance policy identifier 1602 exists (and the status 1610 is to "consider" for a future insurance relationship).

Figure 17:
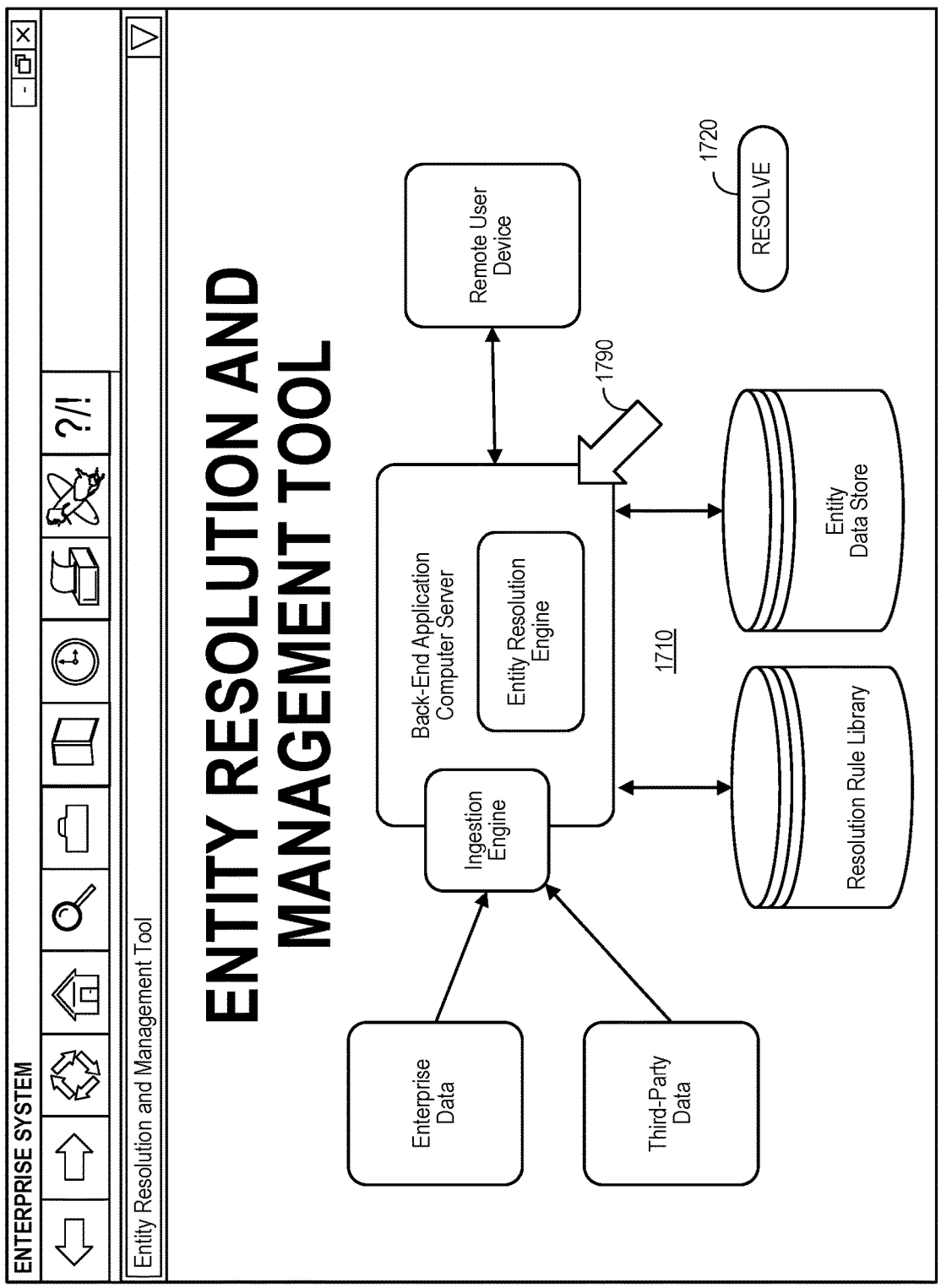
FIG. 17 is an operator or administrator display in accordance with some embodiments.

The operation of the enterprise entity resolution and/or management tool may be controlled via a Graphical User Interface ("GUI"). For example, FIG. 17 is an entity resolution operator or administrator display 1700 including graphical representations of elements of such a tool 1710 according to some embodiments. Selection of a portion or element of the display 1700 via a touchscreen or pointer 1790 might result in the presentation of additional information about that portion or element (e.g., a popup window presenting a data source or a resolution result table) or let an operator or administrator enter or annotate additional information about resolution rules (e.g., based on his or her experience and expertise). A "resolve" icon 1720 might initiate an entity resolution process.

Thus, embodiments may provide an entity resolution tool at scale and active entity profile management may be performed for commercial businesses. Moreover, according to some embodiments, the system may harmonize enterprise information (e.g., associated with insurance policies).

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with embodiments of the present invention (e.g., some of the information associated with the displays described herein might be implemented as a virtual or augmented reality display and/or the databases described herein may be combined or stored in external systems). Moreover, although embodiments have been described with respect to specific types of entities, embodiments may instead be associated with other types of businesses in additional to and/or instead of those described herein. Similarly, although certain types of insurance, business operation, and entity parameters were described in connection some embodiments herein, other types of insurance products and/or entity parameters might be used instead.

Figure 18:
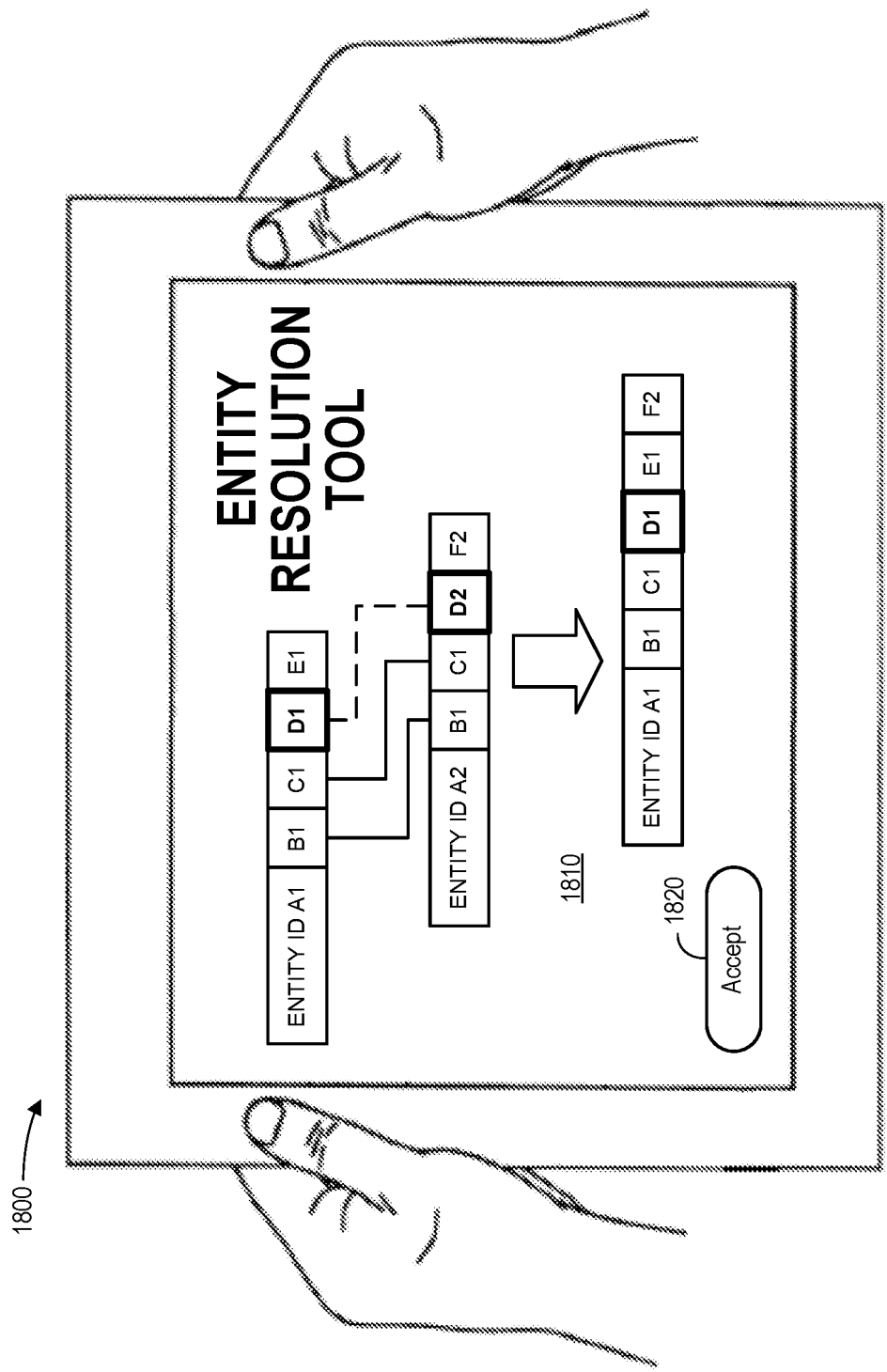
FIG. 18 illustrates a tablet computer with an enterprise entity management tool display according to some embodiments.

Note that the displays and devices illustrated herein are only provided as examples, and embodiments may be associated with any other types of user interfaces. For example, FIG. 18 illustrates a handheld tablet computer 1800 with an entity resolution display 1810 according to some embodiments. The entity resolution display 1810 shows elements that may be utilized by a user of the tablet computer 1800 (e.g., via an "Accept" icon 1820) to review and/or approve entity resolution decisions. According to some embodiments, the display 1810 also includes an indication of a confidence level that could help, for example, a user and/or machine learning identify potential problems and/or appropriate changes to entity resolution logic (e.g., when certain types of parameters are not being correctly resolved).

Figure 19:
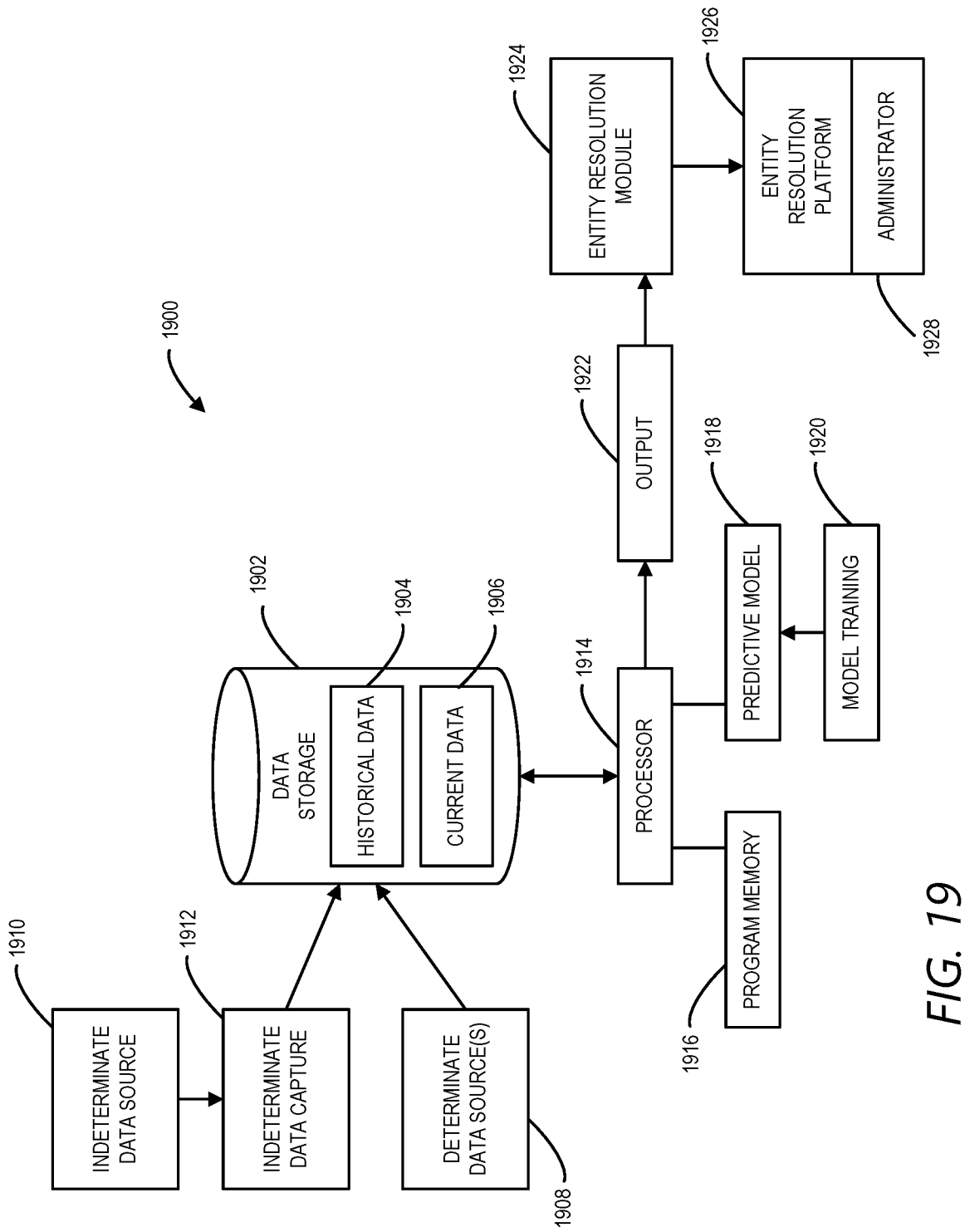
FIG. 19 illustrates a system having a predictive model in accordance with some embodiments.

According to some embodiments, one or more machine learning algorithms and/or predictive models may be used to perform automatic entity resolution, select and execute enterprise workflows, and/or identify entity information issues (e.g., associated with entities that were not successfully resolved to flag existing rules or suggest new rules). Features of some embodiments associated with a predictive model will now be described by referring to FIG. 19. FIG. 19 is a partially functional block diagram that illustrates aspects of a computer system 1900 provided in accordance with some embodiments of the invention. For present purposes it will be assumed that the computer system 1900 is operated by an insurance company (not separately shown) for the purpose of supporting automated entity resolutions (e.g., to streamline the collection of and use of business information). According to some embodiments, the third-party data and/or risk relationship data may also be used to supplement and leverage the computer system 1900.

The computer system 1900 includes a data storage module 1902. In terms of its hardware the data storage module 1902 may be conventional, and may be composed, for example, by one or more magnetic hard disk drives. A function performed by the data storage module 1902 in the computer system 1900 is to receive, store and provide access to both historical data 1904 and current data 1906. As described in more detail below, the historical data 1904 is employed to train a predictive model to provide an output that indicates an identified performance metric and/or an algorithm to score or evaluate resolution decisions, and the current data 1906 is thereafter analyzed by the predictive model. Moreover, as time goes by, and results become known from processing current resolution decisions, at least some of the current decisions may be used to perform further training of the predictive model. Consequently, the predictive model may thereby adapt itself to changing conditions.

Either the historical data 1904 or the current data 1906 might include, according to some embodiments, determinate and indeterminate data. As used herein and in the appended claims, "determinate data" refers to verifiable facts such as an age of a business; a business type; an insurance policy date or other date; a time of day; a day of the week; a geographic location, address or ZIP code; and a policy number.

As used herein, "indeterminate data" refers to data or other information that is not in a predetermined format and/or location in a data record or data form. Examples of indeterminate data include information from web sites, narrative speech or text, information in descriptive notes fields and signal characteristics in audible voice data files, etc.

The determinate data may come from one or more determinate data sources 1908 that are included in the computer system 1900 and are coupled to the data storage module 1902. The determinate data may include "hard" data like an entity name, date of incorporation, tax identifier number, insurance policy number, address, an underwriter decision, etc. One possible source of the determinate data may be the insurance company's policy database (not separately indicated).

The indeterminate data may originate from one or more indeterminate data sources 1910 and may be extracted from raw files or the like by one or more indeterminate data capture modules 1912. Both the indeterminate data source(s) 1910 and the indeterminate data capture module(s) 1912 may be included in the computer system 1900 and coupled directly or indirectly to the data storage module 1902. Examples of the indeterminate data source(s) 1910 may include data storage facilities for big data streams, document images, text files, and web pages. Examples of the indeterminate data capture module(s) 1912 may include one or more optical character readers, a speech recognition device (i.e., speech-to-text conversion), a computer or computers programmed to perform NLP, a computer or computers programmed to identify and extract information from images or video, a computer or computers programmed to detect key words in text files, and a computer or computers programmed to detect indeterminate data regarding an entity such as a health inspection report, a police report, a repair bill, etc.

The computer system 1900 also may include a computer processor 1914. The computer processor 1914 may include one or more conventional microprocessors and may operate to execute programmed instructions to provide functionality as described herein. Among other functions, the computer processor 1914 may store and retrieve historical insurance data 1904 and current data 1906 in and from the data storage module 1902. Thus, the computer processor 1914 may be coupled to the data storage module 1902.

The computer system 1900 may further include a program memory 1916 that is coupled to the computer processor 1914. The program memory 1916 may include one or more fixed storage devices, such as one or more hard disk drives, and one or more volatile storage devices, such as RAM devices. The program memory 1916 may be at least partially integrated with the data storage module 1902. The program memory 1916 may store one or more application programs, an operating system, device drivers, etc., all of which may contain program instruction steps for execution by the computer processor 1914.

The computer system 1900 further includes a predictive model component 1918. In certain practical embodiments of the computer system 1900, the predictive model component 1918 may effectively be implemented via the computer processor 1914, one or more application programs stored in the program memory 1916, and computer stored as a result of training operations based on the historical data 1904 (and possibly also data received from a third party). In some embodiments, data arising from model training may be stored in the data storage module 1902, or in a separate computer store (not separately shown). A function of the predictive model component 1918 may be to determine appropriate performance metric scores, scoring algorithms, entity resolution rules or decisions, etc. The predictive model component may be directly or indirectly coupled to the data storage module 1902.

The predictive model component 1918 may operate generally in accordance with conventional principles for predictive models, except, as noted herein, for at least some of the types of data to which the predictive model component is applied. Those who are skilled in the art are generally familiar with programming of predictive models. It is within the abilities of those who are skilled in the art, if guided by the teachings of this disclosure, to program a predictive model to operate as described herein.

Still further, the computer system 1900 includes a model training component 1920. The model training component 1920 may be coupled to the computer processor 1914 (directly or indirectly) and may have the function of training the predictive model component 1918 based on the historical data 1904 and/or information about entities. (As will be understood from previous discussion, the model training component 1920 may further train the predictive model component 1918 as further relevant data becomes available.) The model training component 1920 may be embodied at least in part by the computer processor 1914 and one or more application programs stored in the program memory 1916. Thus, the training of the predictive model component 1918 by the model training component 1920 may occur in accordance with program instructions stored in the program memory 1916 and executed by the computer processor 1914.

In addition, the computer system 1900 may include an output device 1922. The output device 1922 may be coupled to the computer processor 1914. A function of the output device 1922 may be to provide an output that is indicative of (as determined by the trained predictive model component 1918) particular risk scores, entity resolution rules or decisions, etc. The output may be generated by the computer processor 1914 in accordance with program instructions stored in the program memory 1916 and executed by the computer processor 1914. More specifically, the output may be generated by the computer processor 1914 in response to applying the data for the current simulation to the trained predictive model component 1918. The output may, for example, be a numerical estimate, a likelihood within a predetermined range of numbers, a defined series of resolution rules, automatically generated alerts or suggestions, etc. In some embodiments, the output device may be implemented by a suitable program or program module executed by the computer processor 1914 in response to operation of the predictive model component 1918.

Still further, the computer system 1900 may include an entity resolution module 1924. The entity resolution module 1924 may be implemented in some embodiments by a software module executed by the computer processor 1914. The entity resolution module 1924 may have the function of rendering a portion of the display on the output device 1922. Thus, the entity resolution module 1924 may be coupled, at least functionally, to the output device 1922. In some embodiments, for example, the entity resolution module 1924 may direct communications with an enterprise by referring to an administrator 1928 via an entity resolution platform 1926, messages customized and/or generated by the predictive model component 1918 (e.g., suggesting resolution rules, appropriate actions, workflows, etc.) and found to be associated with various entities or types of entities. In some embodiments, these results may be provided to the administrator 1928 who may also be tasked with determining whether or not the messages may be improved.

The present invention has been described in terms of several embodiments solely for the purpose of illustration. Persons skilled in the art will recognize from this description that the invention is not limited to the embodiments described but may be practiced with modifications and alterations limited only by the spirit and scope of the appended claims.

What is claimed:

1. An entity resolution system implemented via a back-end application computer server of an enterprise, comprising:
   (a) an entity data store associated with an encrypted database management system, the entity data store containing contains electronic records associated with a plurality of entities, and, for each entity, a set of electronic records including an entity identifier, entity operational data, and parameters associated with that entity;
   (b) a resolution rule library that contains electronic records associated with rules for resolving entities, and, for each rule, a set of electronic records including a resolution rule identifier and resolution rule logic;
   (c) the back-end application computer server, coupled to the entity data store and resolution rule library, including:
      an ingestion engine to receive big data input including entity operational data and parameters associated with entities,
      a computer processor coupled to the ingestion engine,
      a computer memory coupled to the computer processor and storing instructions that, when executed by the computer processor, cause the back-end application computer server to:
         access information in the resolution rule library,
         based on resolution rule logic from the resolution rule library and the received big data input, automatically resolve that two electronic records with different entity identifiers are associated with a single entity,
         update the entity data store to reflect information for a resolved single entity identifier,
         generate a popup window on an interactive user interface display in response to selection of an element on the interactive user interface display, wherein the popup window provides additional information that is not available without the selection to reduce a number of electronic messages transmitted,
         and
         automatically execute an enterprise workflow for a risk relationship between the enterprise and the entity represented by the resolved single entity identifier;
   (d) a communication port coupled to the back-end application computer server to facilitate an exchange of data with a remote device to support the interactive user interface display via security features, the interactive user interface displays providing information about the resolved single entity identifier and the executed enterprise workflow;
   (e) an email server, coupled to the back-end application computer server, that automatically establishes communication links and transmit electronic messages to entity communication addresses;
   (f) a calendar server, coupled to the back-end application computer server, that automatically schedules tasks and communications; and
   (g) a workflow server, coupled to the back-end application computer server, that initiates actions by employees of the enterprise.

2. The system of claim 1, wherein the entities comprise commercial businesses.

3. The system of claim 2, wherein the entity operational data includes at least one of: (i) an income, (ii) a business size, (iii) a number of employees, and (iv) a business type.

4. The system of claim 2, wherein the parameters associated with an entity include at least one of: (i) a business name, (ii) one or more business addresses, and (iii) a business owner.

5. The system of claim 2, wherein information in the entity data store is based on at least one of: (i) an enterprise database, (ii) a governmental database, (iii) a third-party database, (iv) a credit reporting database, (v) web information, and (vi) social media information.

6. The system of claim 1, wherein the resolution rule logic is associated with at least one of: (i) data deduplication, (ii) spelling variations, (iii) entity ownership information, and (iv) location information.

7. The system of claim 1, wherein the ingestion engine ingests information at least one of: (i) periodically, and (ii) upon a change in value.

8. The system of claim 1, wherein the enterprise is associated with an insurer.

9. The system of claim 8, wherein the enterprise workflow is associated with at least one of: (i) consider for a potential future risk relationship, (ii) an adjustment to an existing risk relationship, and (iii) a risk relationship renewal.

10. The system of claim 9, wherein the risk relationship is associated with at least one of: (i) general liability insurance, (ii) workers' compensation insurance, (iii) business insurance, (iv) vehicle insurance, (v) health insurance, (vi) professional liability insurance, (vii) cyber insurance, (viii) property insurance, and (ix) disaster insurance.

11. The system of claim 1, wherein machine learning is associated with at least one of: (i) automatic resolution by the back-end application computer server, (ii) enterprise workflow execution, and (iii) identification of entity information issues.

12. An entity resolution method implemented via a back-end application computer server of an enterprise, comprising:

receiving, by an ingestion engine, big data input including entity operational data and parameters associated with those entities;

accessing, by a computer processor of the back-end application computer server, information in a resolution rule library that contains electronic records associated with an encrypted database management system and associated with rules for resolving entities, including, for each rule, a set of electronic records including a resolution rule identifier and resolution rule logic;

based on resolution rule logic from the resolution rule library and the received big data input, automatically resolving that two electronic records with different entity identifiers are associated with a single entity;

updating an entity data store to reflect information for a resolved single entity identifier;

generating a popup window on an interactive user interface display in response to selection of an element on the interactive user interface display, wherein the popup window provides additional information that is not available without the selection to reduce a number of electronic messages transmitted, automatically executing an enterprise workflow for a risk relationship between the enterprise and the entity represented by the resolved single entity identifier;

automatically establishing, by an email server, coupled to the back-end application computer server, communication links and transmit electronic messages to entity communication addresses;

automatically scheduling, by a calendar server coupled to the back-end application computer server, tasks and communications; and initiating, by a workflow server coupled to the back-end application computer server, actions by employees of the enterprise.

13. The method of claim 12, wherein the entities comprise commercial businesses.

14. The method of claim 13, wherein the entity operational data includes at least one of: (i) an income, (ii) a business size, (iii) a number of employees, and (iv) a business type.

15. The method of claim 13, wherein the parameters associated with an entity include at least one of: (i) a business name, (ii) one or more business addresses, and (iii) a business owner.

16. The method of claim 13, wherein information in the entity data store is based on at least one of: (i) an enterprise database, (ii) a governmental database, (iii) a third-party database, (iv) a credit reporting database, (v) web information, and (vi) social media information.

17. The method of claim 13, wherein the resolution rule logic is associated with at least one of: (i) data deduplication, (ii) spelling variations, (iii) entity ownership information, and (iv) location information.

18. A non-transitory, computer-readable medium storing instructions, that, when executed by a processor, cause the processor to perform an entity resolution method implemented via a back-end application computer server of an enterprise, the method comprising:

receiving, by an ingestion engine, big data input including entity operational data and parameters associated with entities;

accessing, by a computer processor of the back-end application computer server, information in a resolution rule library that contains electronic records associated with an encrypted database management system and associated with rules for resolving entities, including, for each rule, a set of electronic records including a resolution rule identifier and resolution rule logic;

based on resolution rule logic from the resolution rule library and the received big data input, automatically resolving that two electronic records with different entity identifiers are associated with a single entity;

updating the entity data store to reflect information for a resolved single entity identifier;

generating a popup window on an interactive user interface display in response to selection of an element on the interactive user interface display, wherein the popup window provides additional information that is not available without the selection to reduce a number of electronic messages transmitted, automatically executing an enterprise workflow for a risk relationship between the enterprise and the entity represented by the resolved single entity identifier;

automatically establishing, by an email server, coupled to the back-end application computer server, communication links and transmit electronic messages to entity communication addresses;

automatically scheduling, by a calendar server coupled to the back-end application computer server, tasks and communications; and initiating, by a workflow server coupled to the back-end application computer server, actions by employees of the enterprise.

19. The medium of claim 18, wherein the enterprise is associated with an insurer.

20. The medium of claim 19, wherein the enterprise workflow is associated with at least one of: (i) consider for a potential future risk relationship, (ii) an adjustment to an existing risk relationship, and (iii) a risk relationship renewal.

21. The medium of claim 20, wherein the risk relationship is associated with at least one of: (i) general liability insurance, (ii) workers' compensation insurance, (iii) business insurance, (iv) vehicle insurance, (v) health insurance, (vi) professional liability insurance, (vii) cyber insurance, (viii) property insurance, and (ix) disaster insurance.

22. The medium of claim 18, wherein machine learning is associated with at least one of: (i) automatic resolution by the back-end application computer server, (ii) enterprise workflow execution, and (iii) identification of entity information issues.

* * * * *